US011254170B2

(12) United States Patent
Furtado

(10) Patent No.: US 11,254,170 B2
(45) Date of Patent: Feb. 22, 2022

(54) AUTOMATIC TIRE INFLATION SYSTEM WITH THRU-HUB AIR FEED

(71) Applicant: Tesla, Inc., Austin, TX (US)

(72) Inventor: John Furtado, San Francisco, CA (US)

(73) Assignee: Tesla, Inc., Austin, TX (US)

( * ) Notice: Subject to any disclaimer, the term of this patent is extended or adjusted under 35 U.S.C. 154(b) by 224 days.

(21) Appl. No.: 15/952,366

(22) Filed: Apr. 13, 2018

(65) Prior Publication Data

US 2018/0297423 A1 Oct. 18, 2018

Related U.S. Application Data

(60) Provisional application No. 62/485,272, filed on Apr. 13, 2017.

(51) Int. Cl.
*B60C 23/00* (2006.01)
*B60B 27/00* (2006.01)
*F16C 19/36* (2006.01)
*F16C 19/38* (2006.01)

(52) U.S. Cl.
CPC .... *B60C 23/00363* (2020.05); *B60B 27/0047* (2013.01); *B60B 27/0073* (2013.01); *B60C 23/00354* (2020.05); *B60B 27/001* (2013.01); *B60B 2380/14* (2013.01); *B60B 2380/64* (2013.01); *F16C 19/364* (2013.01); *F16C 19/385* (2013.01)

(58) Field of Classification Search
CPC ............... B60C 23/003; B60C 23/007; B60C 23/00347; B60C 23/00363; B60C 23/00354; F16C 19/364; B60B 27/001; B60B 2380/14; B60B 2380/64; B60B 27/0073; B60B 27/0047
See application file for complete search history.

(56) References Cited

U.S. PATENT DOCUMENTS

| | | | | |
|---|---|---|---|---|
| 2,944,579 A | * | 7/1960 | Wunibald | B60C 23/003 152/416 |
| 4,582,107 A | * | 4/1986 | Scully | B60C 23/007 152/415 |
| 5,287,906 A | | 2/1994 | Stech | |
| 5,377,736 A | | 1/1995 | Stech | |
| 5,503,480 A | * | 4/1996 | Caillaut | B60C 23/003 152/417 |
| 5,538,062 A | | 7/1996 | Stech | |
| 5,584,949 A | | 12/1996 | Ingram | |

(Continued)

*Primary Examiner* — Kip T Kotter
(74) *Attorney, Agent, or Firm* — Knobbe, Martens, Olson & Bear, LLP

(57) ABSTRACT

An Automatic Tire Inflation System (ATIS) for use with a vehicle includes a controller, valves controlled by the controller and, for at least one drive axle having inner bearings and outer bearings, a channel formed in a spindle, first hosing coupling controlled by the controller to the channel formed in the spindle, a channel formed in a hub, a rotary air seal coupling the channel formed in the spindle to the channel formed in the hub, and second hosing coupling the channel formed in the hub to at least one wheel. The rotary air seal may transition from a sealed state that forms a seal between the spindle and the hub to support air flow between the channel formed in the spindle and the channel formed in hub and reside in an unsealed state to negate the seal between the spindle and the hub.

14 Claims, 10 Drawing Sheets

(56) References Cited

U.S. PATENT DOCUMENTS

| | | | |
|---|---|---|---|
| 5,797,979 A | 8/1998 | Quinn | |
| 5,868,881 A | 2/1999 | Bradley | |
| 6,269,691 B1 | 8/2001 | Sowatzke et al. | |
| 6,435,238 B1 | 8/2002 | Hennig | |
| 6,698,482 B2 | 3/2004 | Hennig et al. | |
| 6,892,778 B2 | 5/2005 | Hennig et al. | |
| 9,221,395 B2 * | 12/2015 | Honig | B60C 23/0488 |
| 2010/0181739 A1 * | 7/2010 | Eschenburg | B60C 23/003 |
| | | | 280/124.125 |
| 2015/0231937 A1 * | 8/2015 | Holdrich | B60C 29/02 |
| | | | 152/417 |
| 2015/0290986 A1 * | 10/2015 | Tsiberidis | F16J 15/324 |
| | | | 152/417 |
| 2015/0352911 A1 * | 12/2015 | Bittlingmaier | B60B 27/0073 |
| | | | 152/417 |

* cited by examiner

AUTOMATIC TIRE INFLATION SYSTEM WITH THRU-HUB AIR FEED

CROSS-REFERENCE TO RELATED APPLICATION

The present application claims priority pursuant to 35 U.S.C. 120 to U.S. Provisional Patent Application No. 62/485,272, entitled "AUTOMATIC TIRE INFLATION SYSTEM WITH THRU-HUB AIR FEED", filed 13 Apr. 2017, which is incorporated herein by reference in its entirety for all purposes.

BACKGROUND

Technical Field

The present invention relates to vehicles; and more particularly to the automatic inflation of vehicle tires.

Description of Related Art

Cars and trucks have wheels and tires that interface with roadways. The tires are typically inflated with air or another gas. Generally, tires are most efficient and provide the best interface when inflated to a target pressure(s). Some land based vehicles include more than four wheels, e.g., semi tractors that include four, eight, more rear wheels. All of these rear wheels are typically powered, with four wheels and tires driven by a single axle or via a single differential. A single engine may drive the rear wheels via one or more drive shafts and differentials. Maintaining the target pressure(s) on all of these tires is difficult. Thus, Automatic Tire Inflation Systems (ATISs) have been developed in an attempt to maintain the target air pressure in all of the tires. Examples of such prior ATISs are disclosed in one or more of prior U.S. Pat. Nos. 5,287,906, 5,584,949, 5,797,398, 5,797,979, 6,698,482, 5,377,736, 5,538,062, 5,868,881, 6,269,691, 6,435,238 and 6,892,778.

These prior solutions had a number of shortcomings. With some prior art techniques, air was fed through hollow drive axles to a fitting located on the end thereof. The fitting was then coupled to the air inlets of the tires. To couple the air into the hollow drive axles, a rotatingly attached fitting coupled air from an air storage to the inside of the hollow axles. This fitting was subject to leakage of contaminants. These contaminants interfered with the operation of the ATIS and eventually caused the ATIS to fail.

SUMMARY

Thus, in order to overcome the shortcomings described above among other shortcomings, an Automatic Tire Inflation System (ATIS) for use with a vehicle according to a first described embodiment includes a controller, valves controlled by the controller, the valves having an air supply inlet, and a plurality of air outlets. Further the ATIS includes, for at least one drive axle having inner bearings and outer bearings, a channel formed in a spindle, first hosing coupling a valve of the valves controlled by the controller to the channel formed in the spindle, a channel formed in a hub, a rotary air seal residing between the inner bearings and the outer bearings and coupling the channel formed in the spindle to the channel formed in the hub, and second hosing coupling the channel formed in the hub to at least one wheel.

Thus, as compared to the prior ATIS systems, the ATIS of the first embodiment, significantly reduces contamination in the ATIS air stream. Reduction in contamination extends the life of the ATIS, extends spindle life, extends hub life, and extends serviced wheel/tire lives and extends maintenance intervals.

According to some optional aspects of the first embodiment, a first fitting couples the first hosing to the channel formed in the spindle, a second fitting couples the second hosing to the channel formed in the hub, and/or the second hosing provides connections for multiple wheels.

According to another optional aspect of the first embodiment, the spindle is tapered, the inner bearings comprise inner tapered roller bearings, and the outer bearings comprise outer tapered roller bearings.

According to still another optional aspect, the spindle is straight and the inner bearings and outer bearings comprise a unitized bearing set. With this optional aspect, a first channel couples the channel formed in the spindle to the rotary air seal and a second channel that couples the channel formed in the hub to the rotary air seal.

According to yet another optional aspect of the first embodiment, the rotary air seal is configured to reside in a sealed state to form a seal between the spindle and the hub to support air flow between the channel formed in the spindle and the channel formed in hub and reside in an unsealed state to negate the seal between the spindle and the hub. With this optional aspect, transitioning the rotary air seal from the unsealed state to the sealed state may be performed only when a serviced vehicle is stationary or a speed of the serviced vehicle is below a threshold speed. Further, with this optional aspect, the rotary air seal may be periodically transitioned between the sealed state and the unsealed state.

According to still another optional aspect of the first embodiment, the rotary air seal includes a first side and a second side, each of the first side and the second side including a first stationary portion sealed to an inner wall of the hub, a second stationary portion sealed to an inner wall of the spindle, and a movable portion coupled to the first stationary portion.

According to a second embodiment of the present disclosure, an ATIS includes a controller, valves controlled by the controller, the valves having an air supply inlet, and a plurality of air outlets. The ATIS of the second embodiment further includes, for at least one drive axle, a hub, a spindle, a unitized bearing set having inner bearings and outer bearings coupled between the spindle and the hub, a first channel, and a second channel, a channel formed in the spindle and coupled to the first channel of the unitized bearing set, first hosing coupling a valve of the valves controlled by the controller to the channel formed in the spindle, a channel formed in a hub coupled to the second channel of the unitized bearing set, a rotary air seal residing within the unitized bearing set coupling the first channel of the unitized bearing set to the second channel of the unitized bearing set, and second hosing coupling the channel formed in the hub to at least one wheel.

The second embodiment as well as the third and fourth embodiments described later herein provide benefits substantially the same as those of the first embodiment. The reader will appreciate that the second through fourth embodiments may provide additional benefits as well.

According to a first optional aspect of the second embodiment, the rotary air seal is configured to reside in a sealed state to form a seal between the first channel of the unitized bearing and the second channel of the unitized bearing and reside in an unsealed state to negate the seal between the first channel of the unitized bearing and the second channel of the unitized bearing. With this first optional aspect, the rotary air seal may include a first side and a second side, each of the first side and the second side including a first stationary portion sealed to a first inner wall of a unitized bearing set, a second stationary portion sealed to a second inner wall of the unitized bearing set, and a movable portion coupled to the first stationary portion.

According to a third embodiment of the present disclosure, a method for operating an ATIS for use with a vehicle includes monitoring air pressure of at least one tire, determining that inflation of the at least one tire is required, and opening at least one valve to allow air to flow. The air flows along a path from an air supply to a channel formed in a spindle via first hosing, from the channel formed in the spindle to a rotary air seal, from the rotary air seal to a channel formed in a hub, and from the channel formed in the hub to the at least one tire via second hosing.

According to a first optional aspect of the third embodiment, prior to the opening of the at least one valve to allow air to flow, transitioning the rotary air seal from an unsealed state to a sealed state to establish a seal between a channel formed in the spindle to the channel formed in the hub, and after inflation is completed, transitioning the rotary air seal from the sealed state to the unsealed state to negate the seal between a channel formed in the spindle to the channel formed in the hub. Transitioning the rotary air seal from the unsealed state to the sealed state may be performed only when a serviced vehicle is stationary or a speed of the serviced vehicle is below a threshold speed. Alternately, or in addition, the rotary air seal may periodically transition between the sealed state and the unsealed state.

According to a fourth embodiment of the present disclosure, a method for operating an ATIS for use with a vehicle includes monitoring air pressure of at least one tire, determining that inflation of the at least one tire is required, and opening at least one valve to allow air to flow. The air flows from an air supply to a channel formed in a spindle via first hosing, from the channel formed in the spindle to a first channel of a unitized bearing, from the first channel of the unitized bearing to a rotary air seal, from the rotary air seal to a second channel of the unitized bearing, from the second channel of the unitized bearing to a channel formed in a hub, and from the channel formed in the hub to the at least one tire via second hosing.

According to a first optional aspect of the fourth embodiment, prior to the opening of the at least one valve to allow air to flow, transitioning the rotary air seal from an unsealed state to a sealed state to establish a seal between a first channel of a unitized bearing and a second channel of the unitized bearing and after inflation is completed, transitioning the rotary air seal from the sealed state to the unsealed state to negate the seal between the first channel of the unitized bearing and the second channel of the unitized bearing.

According to a second optional aspect of the fourth embodiment, transitioning the rotary air seal from the unsealed state to the sealed state is performed only when a serviced vehicle is stationary or a speed of the serviced vehicle is below a threshold speed. Alternately, or in addition, the rotary air seal may periodically transition between the sealed state and the unsealed state.

DETAILED DESCRIPTION OF THE DISCLOSURE

Figure 1:
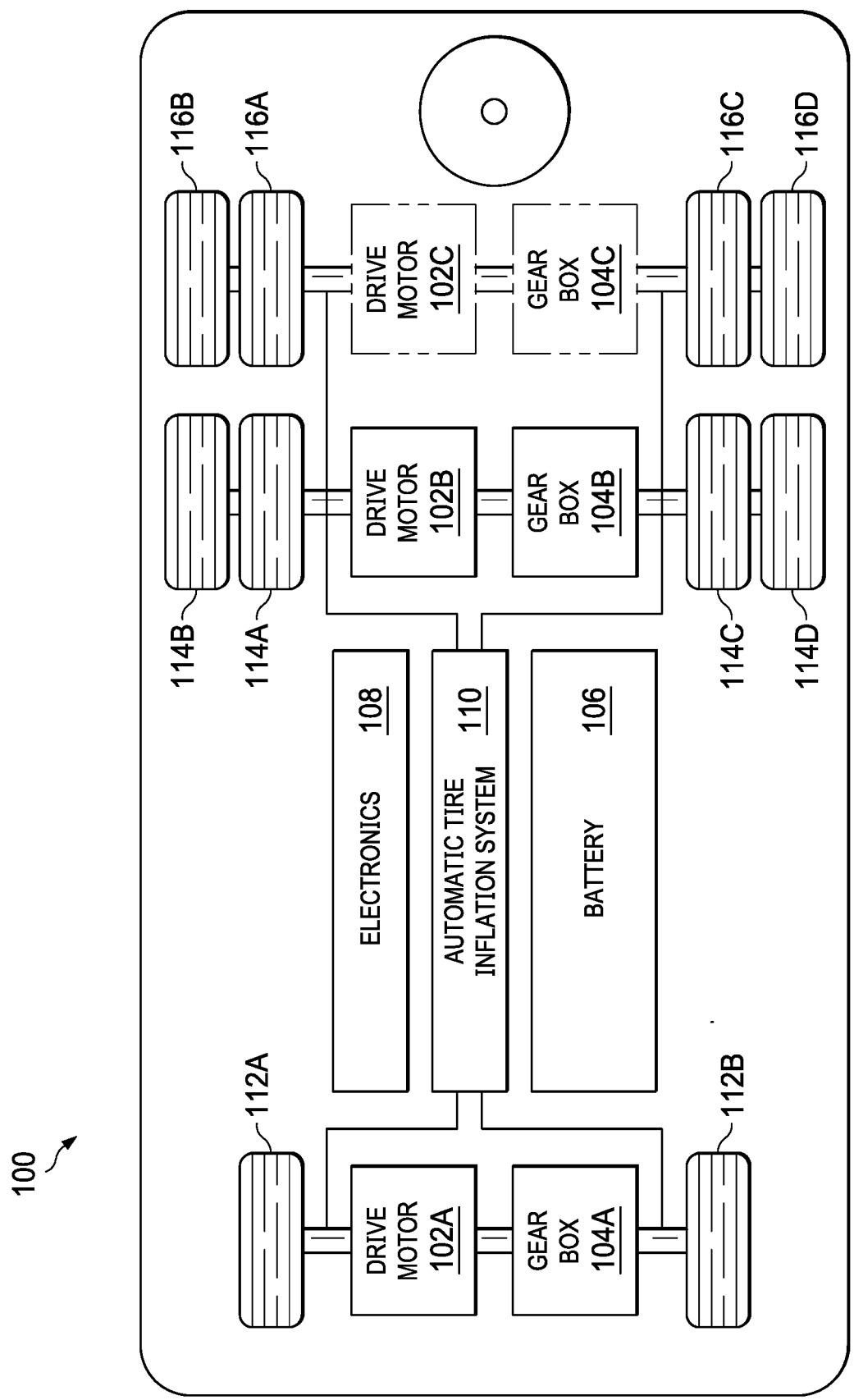
FIG. 1 illustrates the basic components of a battery powered electric vehicle.

FIG. 1 illustrates the basic components of a battery powered electric vehicle (electric vehicle) 100. The electric vehicle 100 includes at least one drive motor (traction motor) 102A, 102B and/or 102C, at least one gear box 104A, 104B, and/or 104C coupled to a corresponding drive motor 102A, 102B, and/or 102C, a battery 106 and electronics 108. Generally, the battery 106 provides electricity to the electronics 108 of the electric vehicle 100 and to propel the electric vehicle 100 using the drive motors 102A, 102B and/or 102C. The electric vehicle 100 includes a large number of other components that are not described herein but known to one or ordinary skill. While the construct of the electric vehicle 100 of FIG. 1 is shown to have ten wheels, differing electric vehicles may have fewer or more than ten wheels. Further, differing types of electric vehicles 100 may incorporate the inventive concepts described herein.

The vehicle also includes an ATIS 110 that provides controlled inflation to tires 112A, 112B, 114A, 114B, 114C, 114D, 116A, 116B, 116C, and 116D. According to a first aspect of the present disclosure, the ATIS 110 includes a controller and valves controlled by the controller, the valves having an air supply inlet, and a plurality of air outlets. Further, the ATIS includes, for at least one drive axle having inner bearings and outer bearings, a channel formed in a spindle, first hosing coupling the valves to the channel formed in the spindle, a channel formed in a hub, a rotary air seal residing between the inner bearings and the outer bearings and coupling the channel formed in the spindle to the channel formed in the hub, and second hosing coupling the channel formed in the hub to at least one tire. Various aspects of the ATIS of the present disclosure will be described further with reference to FIGS. 2 through 6. By feeding air through the channel formed in the spindle, the rotary air seal that resides between the inner bearing and the outer bearing, and the channel formed in the spindle, the risk of contamination is significantly reduced. Particularly, the inner bearing and outer bearing include seals that assist in preventing contamination of the rotary air seal. Further, without the requirement of a hollow axle, the complexity of the ATIS of the present disclosure as compared to the prior ATISs is reduced.

Figure 2:
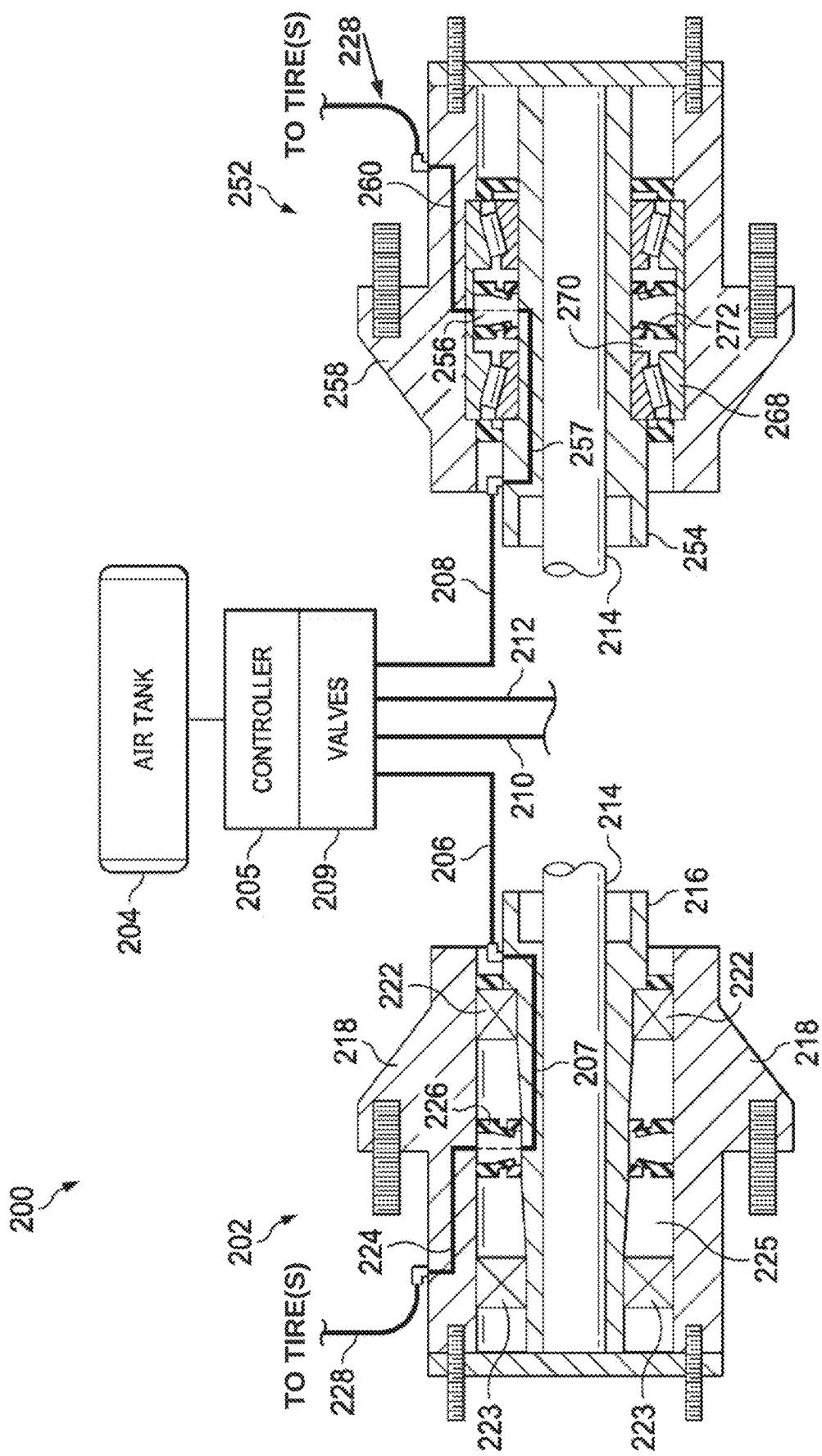
FIG. 2 illustrates an Automatic Tire Inflation System (ATIS) constructed and operating according to at least one disclosed embodiment.

FIG. 2 illustrates an ATIS 200 constructed and operating according to a disclosed embodiment. Two differing embodiments of the ATIS 200 are shown in FIG. 2. A first embodiment of the ATIS 202 is for a first drive configuration having a tapered spindle with tapered roller bearings and the second embodiment of the ATIS 252 is for a straight spindle with a unitized bearing set 268. A single air tank 204, controller 205, and valves 209 service both embodiments 202 and 252.

The first embodiment of the ATIS 202 includes the controller 205 and valves 209. The valves 209 are controlled by the controller 205, have an air supply inlet, and a plurality of air outlets. Each air outlet couples to corresponding hosing 206, 210, 212, and 208. Further, the ATIS 202 includes, for at least one drive axle 214 having inner bearings 222 and outer bearings 223, a channel 207 formed in a spindle 216, first hosing 206 coupling the valves 209 to the channel 207 formed in the spindle 216, a channel 224 formed in a hub 218, a rotary air seal 226 residing between the inner bearings 222 and the outer bearings 223 and coupling the channel 207 formed in the spindle 216 to the channel 224 formed in the hub 218, and second hosing 228 coupling the channel 224 formed in the hub 218 to at least one wheel/tire (not shown in FIG. 2 but shown in FIG. 1).

The ATIS 202 may also include a first fitting coupling the first hosing 206 to the channel 207 formed in the spindle 216. The ATIS may also include a second fitting coupling the second hosing 228 to the channel 224 formed in the hub 218. The second hosing may include connections for multiple tires such as those illustrated in FIG. 1. The hosing includes check valves that allow air to be supplied to the serviced tires and to prevent the back-flow of air from the serviced tires to the servicing hosing. The ATIS 202 (or 252) may include one or more one-way check valves to support flow of air from the air tank 204 to the tires and to prevent air flow from the tires back into the ATIS 202 (or 252). In other embodiments, air is allowed to controllably flow in the reverse direction to reduce air pressure in the serviced tires.

With the ATIS 202 of the first embodiment, the spindle 216 is tapered and the inner bearings 222 and the outer bearings 223 are tapered roller bearings that couple the spindle 216 to the hub 218. The bearings 222 and 223, the spindle 216, and the hub create a volume 225 that is substantially isolated from the external environment. The rotary air seal 226 resides within this volume 225 and, because it is isolated from the external environment, has an extended life.

As will be described with reference to FIGS. 3 and 4, the rotary air seal 226 may be operable in two states; a sealed state and an unsealed state. In the sealed state, the rotary air seal 226 provides a substantially air-tight seal between the spindle 216 and the hub 218 to support the transfer of air from the channel 207 in the spindle 216 to the channel 224 in the hub 218. In the unsealed state, the rotary air seal 226 does not provide such a seal. In various operations, in order to support the inflation of the serviced tires and to extend life of the rotary air seal 226, the rotary air seal 226 may be kept in the unsealed state until wireless sensors in the serviced tires indicate that inflation of the tires is required. In such case, the rotary air seal 226 would be transitioned to the sealed state to provide air for inflation. The controller 205 may control the state of the rotary air seal 226.

Various rules may be implemented to maximize life of the rotary air seal 226. In one operation, the rotary air seal 226 would be transitioned from the unsealed state to the sealed state only when the serviced vehicle is traveling at a relatively low speed or stopped. Alternatively, the rotary air seal 226 would be transitioned from the unsealed state to the sealed state when a tire requires inflation and transitioned back to the unsealed state after inflation is completed, independent of the movement of the vehicle. Further, there may be differing levels of the sealed state, based upon the required air pressure needed to inflate the serviced tires, which would also extend the life of the rotary air seal 226.

The ATIS 252 of the second embodiment includes elements similar to those of the ATIS 202 of the first embodiment. However, with the ATIS 252 of the second embodiment, the spindle 254 is not tapered and the inner bearings and outer bearings comprise a unitized bearing set 268 that couples the spindle 254 to the hub 258. With the ATIS 252, the unitized bearing set 268 includes a channel 256 that couples the channel 257 formed in the spindle 254 to the channel 260 formed in the hub 258 via a rotary air seal 272. Further, the unitized bearing set 268 creates a volume 270 in which the rotary air seal 272 resides, the volume 270 protecting the rotary air seal 272 from the external environment. The rotary air seal 272 of the ATIS 252 may further be operable in both a sealed state and an unsealed state.

With the embodiments of FIG. 2, air pressure sensors at each wheel may detect air pressure in a tire and/or temperature of the tire and wirelessly broadcast this information to the controller 205. The controller 205 then controls the valves 209 to control pressure at each wheel end independently to direct air to serviced tires so that they are at a selected air pressure. For dual tires, e.g., 114A/114B, 116A/116B, 114C/114D, or 116C/116D of FIG. 1, a single wheel end may service two (or more tires). Further, valves may be attached to or integrated into each wheel end that may be opened through wireless or pneumatic signal to allow pressurized air to flow from the air tank 204 to the wheel ends to inflate serviced tires. In such case, the valves 209 may be replaced or augmented by controllable valves at the wheel ends.

Figure 3:
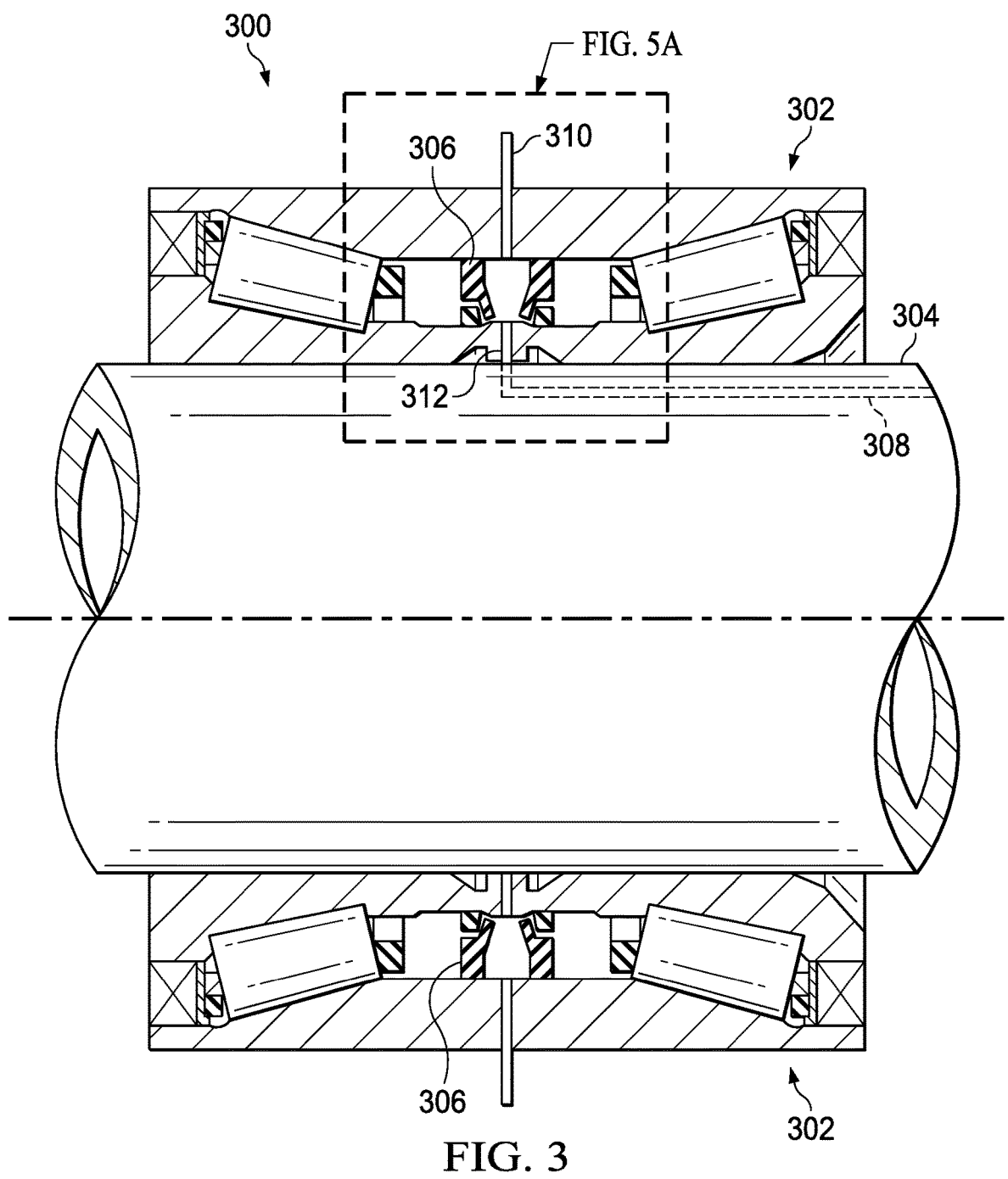
FIG. 3 is a partial cross-sectional view of a spindle, a unitized bearing set, and a rotary air seal according to a described embodiment.

FIG. 3 is a partial cross-sectional view of a spindle, a unitized bearing set, and a rotary air seal according to a described embodiment. The structure 300 of FIG. 3 includes a unitized bearing set 302 that resides between spindle 304 and a hub (not shown). Channel 308 is formed in the spindle to support the flow of air from an air supply through a first channel 312 formed in an inner portion of the unitized bearing set 302, through a rotary air seal 306, and through a second channel 310 formed in the unitized bearing set 302. This air path is employed to inflate one or more serviced tires.

The rotary air seal 306 may be operable in two states; a sealed state and an unsealed state. In the sealed state, the rotary air seal 306 provides a substantially air-tight seal between the spindle 304 and the hub to support the transfer of air from the channel 308 in the spindle 304 to a channel in the hub. In the unsealed state, the rotary air seal 306 does not provide such a seal. In various operations, in order to support the inflation of the serviced tires and to extend life of the rotary air seal 306, the rotary air seal 306 may be kept in the unsealed state until wireless sensors in the serviced tires indicate that inflation of the tires is required. In such case, the rotary air seal 306 would be transitioned to the sealed state to provide air for inflation. The controller 205 may control the state of the rotary air seal 306.

Various rules may be implemented to maximize life of the rotary air seal 306. In one operation, the rotary air seal 306 would be transitioned from the unsealed state to the sealed state only when the serviced vehicle is traveling at a relatively low speed or stopped. Alternatively, the rotary air seal 306 would be transitioned from the unsealed state to the sealed state when a tire requires inflation and transitioned back to the unsealed state after inflation is completed, independent of the movement of the vehicle. Further, there may be differing levels of the sealed state, based upon the required air pressure needed to inflate the serviced tires, which would also extend the life of the rotary air seal 306.

With the embodiment of FIG. 3, the rotary air seal 306 may be operated pneumatically to extend from the unsealed state to the sealed state and back again. The rotary air seal 306 in the sealed state may support pressure above 70 psi, e.g., to a maximum of 150 psi. The rotary air seal 306 is normally non-pressurized to remain in the unsealed state and pressurized only during fill and/or exhaust. The rotary air seal 306 may transition between the sealed state and the unsealed state to reduce degradation of the rotary air seal 306, e.g., 10 seconds in the sealed state and 50 seconds in the unsealed state during a fill or exhaust cycle. Further, the sealed state may be enacted only when the serviced vehicle is stationary or moving at a low speed. By operating the rotary air seal 306 in this manner, the life of the rotary air seal 306 may match the life of the united bearing set 302.

Figure 4:
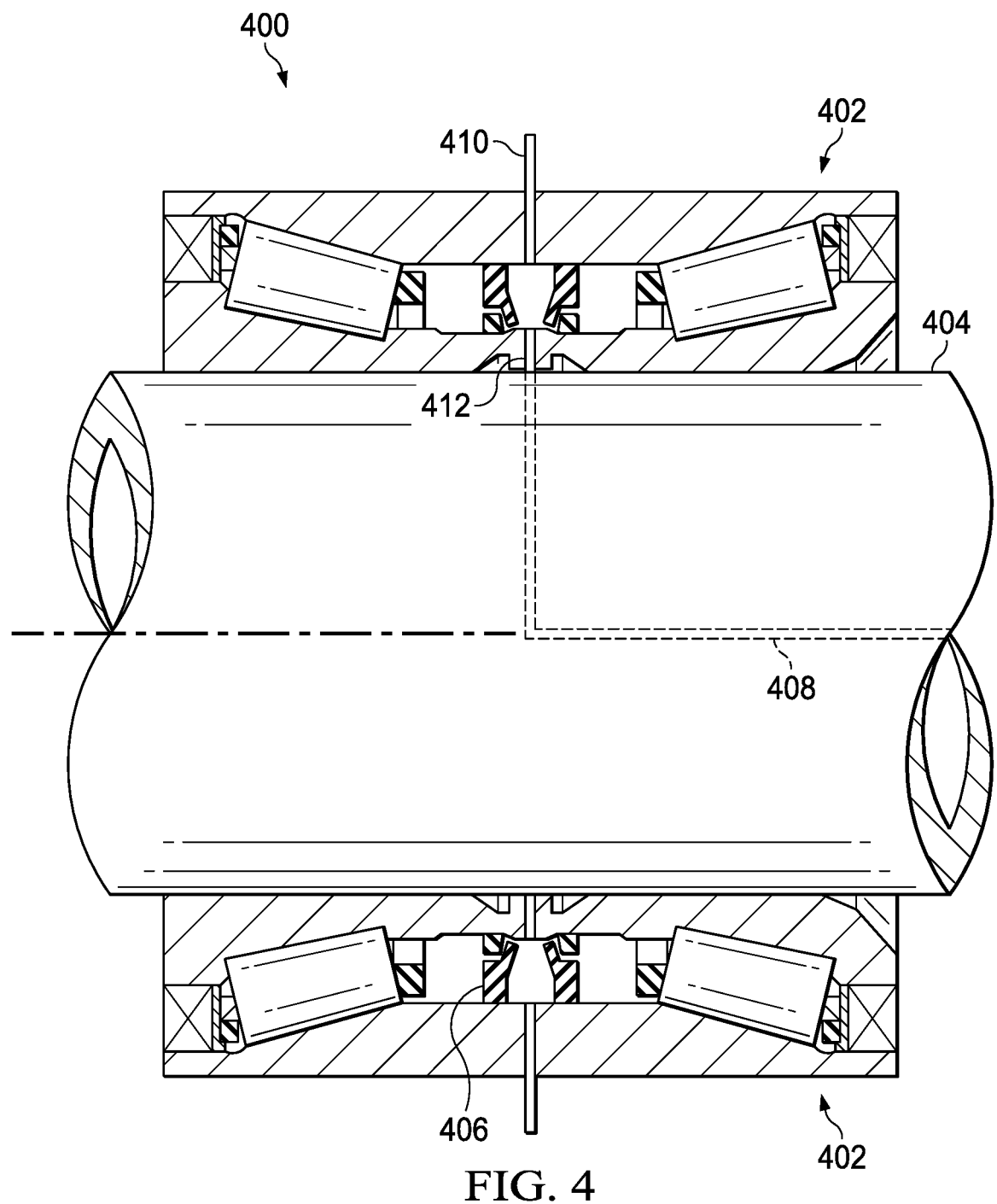
FIG. 4 is a partial cross-sectional view of an axle, a unitized bearing set, and a rotary air seal according to a described embodiment.

FIG. 4 is a partial cross-sectional view of an axle, a unitized bearing set, and a rotary air seal according to a described embodiment. The structure 400 of FIG. 4 includes a unitized bearing set 402 that resides between axle 404 and a hub (not shown). Channel 408 is formed in the axle 404 to support the flow of air from an air supply through a first channel 412 formed in an inner portion of the unitized bearing set 402, through a rotary air seal 406, and through a second channel 410 formed in the unitized bearing set 402. This air path is employed to inflate serviced tires.

As was the case with FIG. 3, the rotary air seal 406 may be operable in two states; a sealed state and an unsealed state. In the sealed state, the rotary air seal 406 provides a substantially air-tight seal between the axle 404 and the hub to support the transfer of air from the channel 408 in the axle 404 to a channel in the hub. In the unsealed state, the rotary air seal 406 does not provide such a seal. In various operations, in order to support the inflation of the serviced tires and to extend life of the rotary air seal 406, the rotary air seal 406 may be kept in the unsealed state until wireless (or wired) sensors in the serviced tires indicate that inflation/deflation of the tires is required. In such case, the rotary air seal 406 would be transitioned to the sealed state to provide air for inflation or to receive air from the tires. The controller 205 may control the state of the rotary air seal 406.

Various rules may be implemented to maximize life of the rotary air seal 406. In one operation, the rotary air seal 406 would be transitioned from the unsealed state to the sealed state only when the serviced vehicle is traveling at a relatively low speed or stopped. Alternatively, the rotary air seal 406 would be transitioned from the unsealed state to the sealed state when a tire requires inflation and transitioned back to the unsealed state after inflation is completed, independent of the movement of the vehicle. Further, there may be differing levels of the sealed state, based upon the required air pressure needed to inflate the serviced tires, which would also extend the life of the rotary air seal 406.

With the embodiment of FIG. 4, the rotary air seal 406 may be operated pneumatically to extend from the unsealed state to the sealed state and back again. The rotary air seal 406 in the sealed state may support pressure above 70 psi, e.g., to a maximum of 150 psi. The rotary air seal 406 is normally non-pressurized to remain in the unsealed state and pressurized only during fill and exhaust. The rotary air seal 406 may transition between the sealed state and the unsealed state to reduce degradation of the rotary air seal 406, e.g., 10 seconds in the sealed state and 50 seconds in the unsealed state during a fill or exhaust cycle. Further, the sealed state may be enacted only when the serviced vehicle is stationary or moving at a low speed. By operating the rotary air seal 406 in this manner, the life of the rotary air seal 406 may match the life of the united bearing set 402.

Figure 5A:
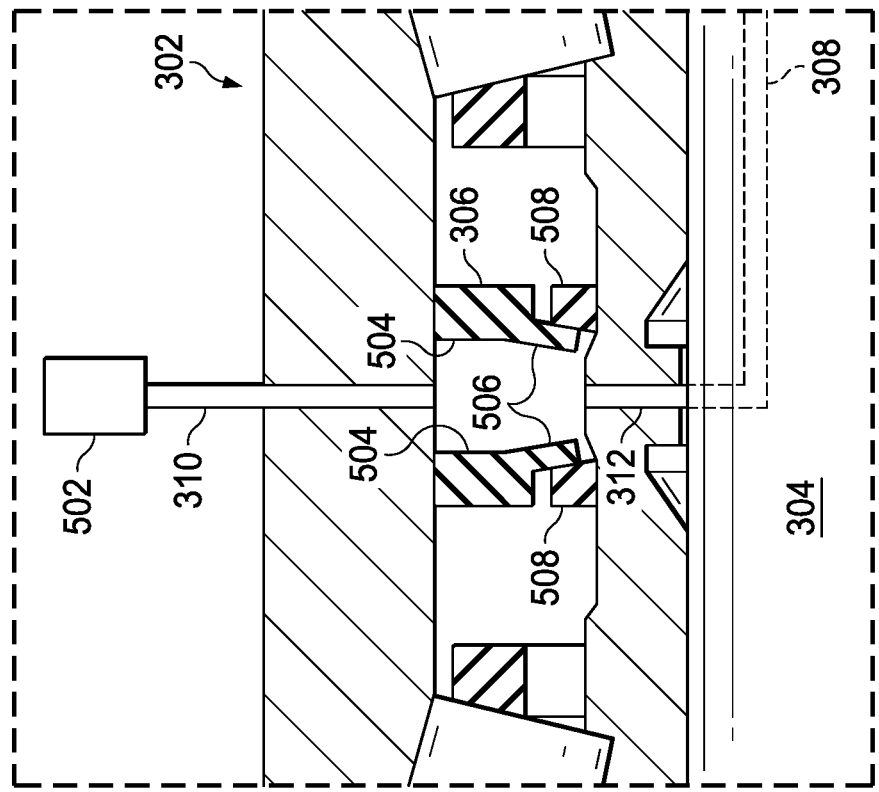
FIG. 5A is a partial cross-sectional view of an axle, a unitized bearing set, and a rotary air seal in an unsealed state according to a described embodiment.
Figure 5B:
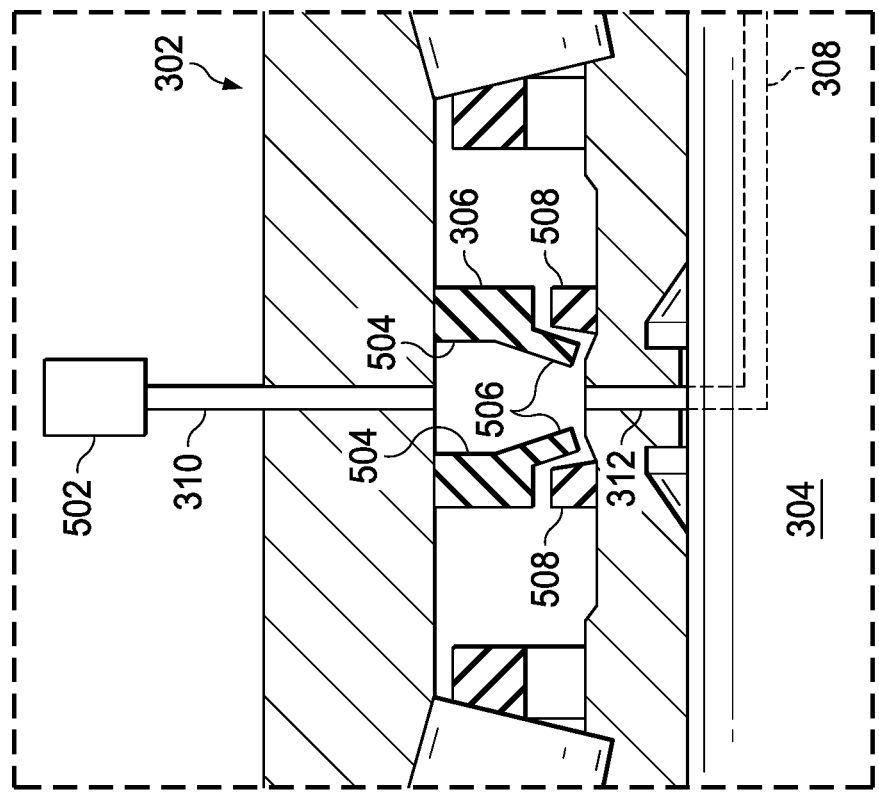
FIG. 5B is a partial cross-sectional view of an axle, a unitized bearing set, and a rotary air seal in a sealed state according to a described embodiment.

FIG. 5A is a partial cross-sectional view of an axle, a unitized bearing set, and a rotary air seal in an unsealed state according to a described embodiment. FIG. 5B is a partial cross-sectional view of an axle, a unitized bearing set, and a rotary air seal in a sealed state according to a described embodiment. Numbering between FIGS. 3, 5A, and 5B is consistent where applicable. Referring to FIG. 5A, the rotary air seal 306 includes two sides, each including a first stationary portion 504 sealed to a first inner wall of the unitized bearing set 302 as shown and a second stationary portion 508 sealed to a second inner wall of the unitized bearing set 302. Each side of the rotary air seal 306 also includes a movable portion 506 coupled to the first stationary portion 504. In the unsealed state, a gap exists between the movable portion 506 and the second stationary portion 508. In this unsealed state, air control valve 502 is closed to prevent transfer of air via second channel 310. Further, air does not flow via channel 308 and first channel 312 when the rotary air seal 306 is in the unsealed state.

Referring to FIG. 5B, the rotary air seal 306 is in the sealed state in which the two sides each form a seal. In the sealed state, the movable portion 506 seals with the second stationary portion 508. In this sealed state, air control valve 502 is open to allow transfer of air via second channel 310 and air flows via channel 308 and first channel 312 to inflate serviced tires. The rotary air seal may be constructed of various materials, including metals, plastics, and synthetic rubber material. In one construct, each of the first stationary portion 504 and the second stationary portion 508 are formed of metal and the movable portion 506 is formed of a flexible material that is capable of forming a seal. This flexible material must be strong enough to resist air pressure of between 70 psi and 150 psi and must be resilient enough to transition from the sealed state to the unsealed state.

In an example of operation of the rotary air seal 306, in the unsealed state, air pressure provided via channel 308 and first channel 312 is insufficient to force the movable portion 506 against the second stationary portion 508. To transition from the unsealed state to the sealed state, the air control valve 502 is closed fully or partially and air pressure is provided via channel 308 and first channel 312, the air pressure sufficient to transition the rotary air seal 306 from the unsealed state to the sealed state. Once sufficient air pressure is applied to transition the rotary air seal 306 from the unsealed state to the sealed state, air control valve 502 is controllably opened to allow air to flow to serviced wheels/tires.

In another example operation, air control valve 502 may be opened sufficiently to apply air pressure to the rotary air seal 306 to force the rotary air seal 306 from the unsealed state to the sealed state (using air stored in serviced tires). Once transitioned to the sealed state, air may be supplied to the serviced wheels/tires to inflate them or air may be evacuated from the wheels/tires.

Figure 6:
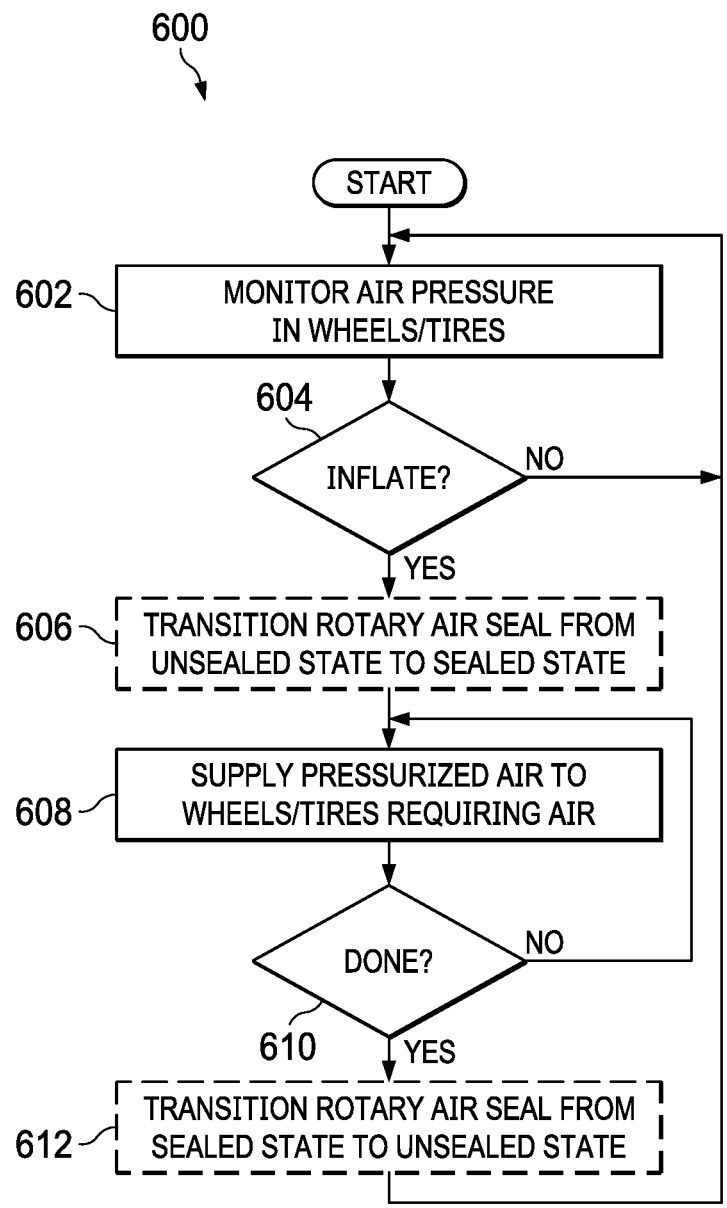
FIG. 6 is a flow chart illustrating operation of an ATIS according to one or more described embodiments.

FIG. 6 is a flow chart illustrating operation of an ATIS according to one or more described embodiments. Operations 600 begin with the ATIS monitoring air pressure in serviced wheels/tires (step 602). Such monitoring may be done via communication between air pressure sensors of the serviced wheels/tires and an ATIS controller. The communication may be wireless or via a conductive path between the serviced wheels/tires and the ATIS controller. The ATIS controller may service multiple differing combinations of wheels/tires and measure their respective air pressures separately. The ATIS then determines whether inflation of one or more wheels/tires is required (decision step 604). If inflation is not required, operation returns to step 602. However, if the ATIS determines that inflation is required at step 604, operation proceeds with the ATIS optionally transitioning a rotary air seal from an unsealed state to a sealed state (step 606). Step 606 is performed when the rotary air seal may be transitioned from the unsealed state to the sealed state. Operations 600 continue with the ATIS supplying pressurized air to wheels/tires requiring air (step 608).

According to a first embodiment, step 606 includes opening at least one valve to allow air to flow from an air supply to a channel formed in a spindle via first hosing, from the channel formed in the spindle to a rotary air seal, from the rotary air seal to a channel formed in a hub, from the channel formed in the hub to the at least one tire via second hosing. According to a second embodiment, step 606 includes opening at least one valve to allow air to flow from an air supply to a channel formed in a spindle via first hosing, from the channel formed in the spindle to a first channel of a unitized bearing, from the first channel of the unitized bearing to a rotary air seal, from the rotary air seal to a second channel of the unitized bearing, from the second channel of the unitized bearing to a channel formed in a hub, and from the channel formed in the hub to the at least one tire via second hosing.

With the completion of the air inflation operations (as determined at step 610), the ATIS optionally transitions the rotary air seal from the sealed state to the unsealed state (step 612). If the air inflation operations are not completed at step 610, operation returns to step 608. From step 612, operation returns to step 602.

As was previously described the rotary air seal may be periodically transitioned from the sealed state to the unsealed state. Further, the rotary air seal may only be transitioned from the unsealed state to the sealed state when the serviced vehicle is stationary or moving at a speed below a threshold speed. These steps are taken in an attempt to extend the life of the rotary air seal. Considering these operations, however, the timing of the operations 600 of FIG. 6 may be based upon these factors. Further, if the air pressure of any wheels/tires combination falls below a lower threshold, these rules may be temporarily modified to support the inflation of a tire.

Figure 7A:
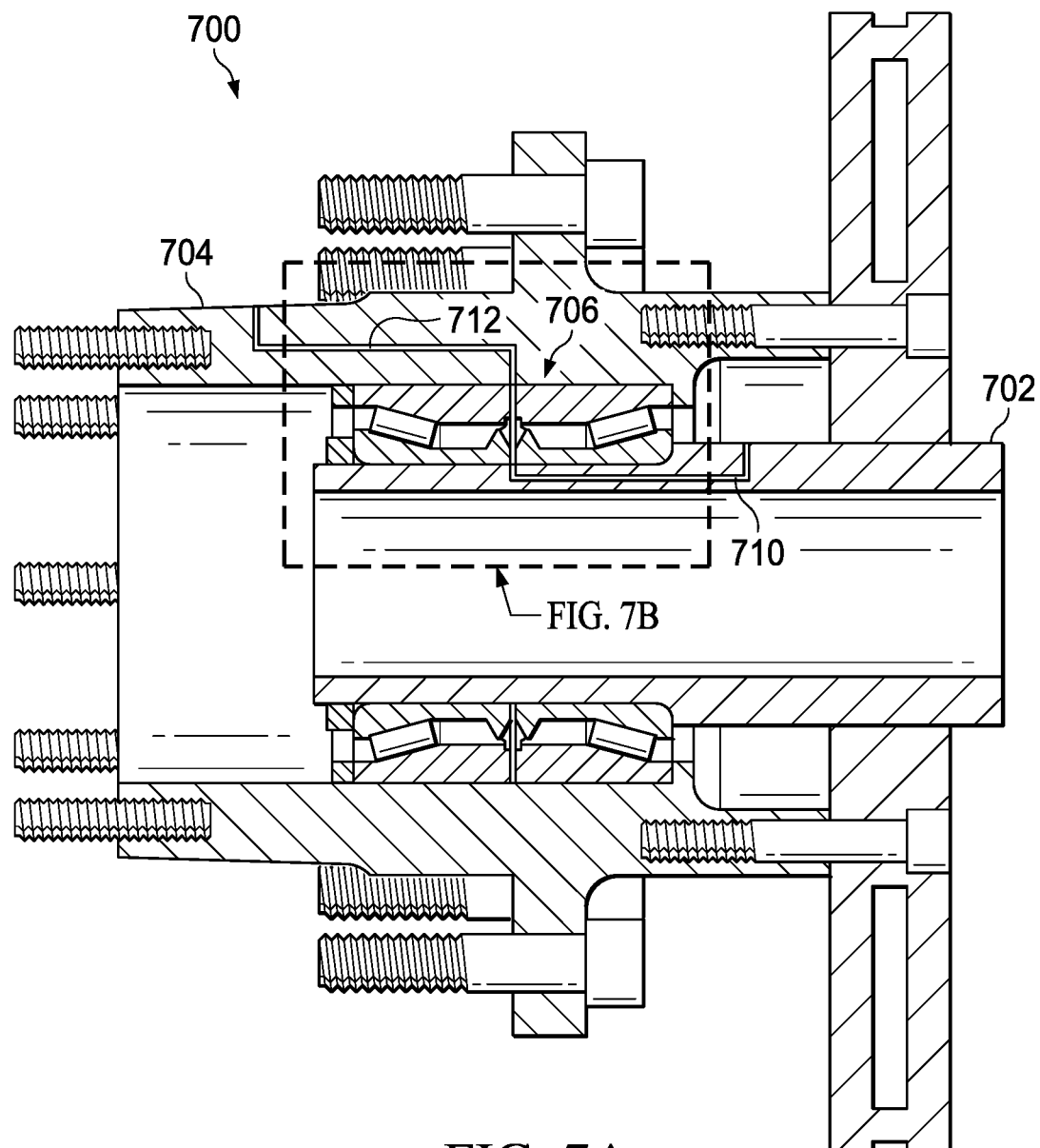
FIG. 7A is a partial cross-sectional view of an axle of an ATIS according to a described embodiment.
Figure 7B:
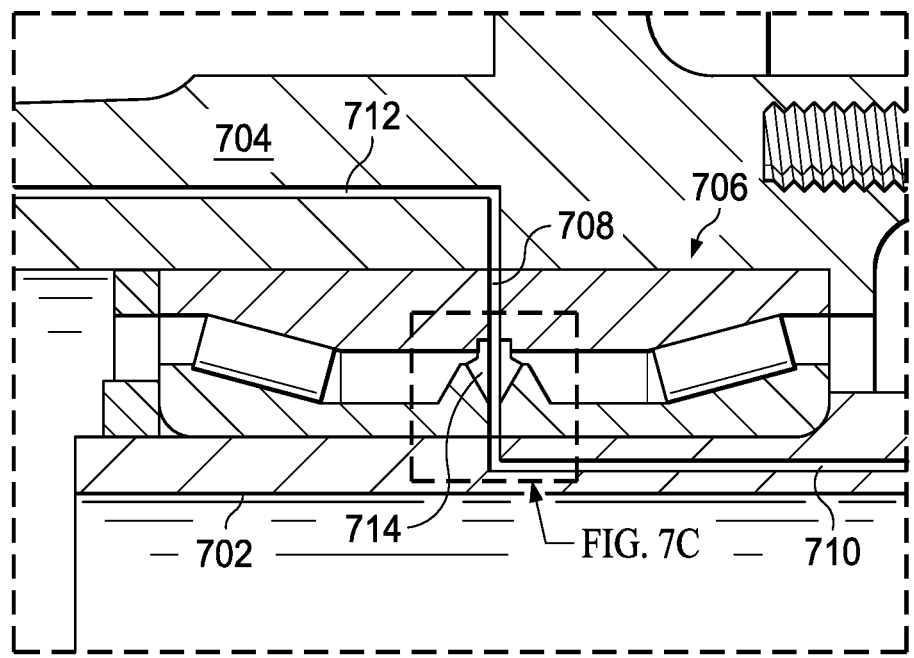
FIG. 7B is a partial cross-sectional view detailing the unitized bearing set of FIG. 7A.
Figure 7C:
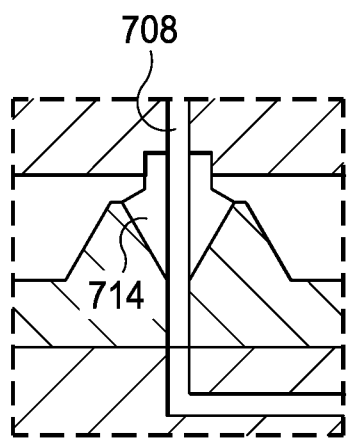
FIG. 7C is a partial cross-sectional view detailing a portion of the unitized bearing set of FIGS. 7A and 7B.

FIG. 7A is a partial cross-sectional view of an axle of an ATIS according to a described embodiment. FIG. 7B is a partial cross-sectional view detailing the unitized bearing set of FIG. 7A. FIG. 7C is a partial cross-sectional view detailing a portion of the unitized bearing set of FIGS. 7A and 7B. Referring to all of FIGS. 7A, 7B, and 7C, the axle 700 includes elements similar to those of the axle of the ATIS 252 of the second embodiment of FIG. 2. The axle 700 includes a spindle 702 that couples to a hub 704 by a unitized bearing set 706. The unitized bearing set 706 includes a channel 708 that couples a channel 710 formed in the spindle 702 to a channel 712 formed in the hub 704 to couple air flow there between. The unitized bearing set 706 includes a volume 714 in which a rotary air seal may reside. In such case, a first portion of the channel 708 of the unitized bearing set 706 couples to the channel 710 formed in the spindle 702 and a second portion of the channel 708 of the unitized bearing set 706 couples to the channel 712 formed in the hub 704. The volume 714 protects the rotary air seal from the external environment. The rotary air seal of the embodiment 700 of FIG. 7A, when present, may further be operable in both a sealed state and an unsealed state. With the axle 700 of FIG. 7A, however, the unitized bearing set 706, itself, may provide a sealed path between the channel 710 formed in the spindle 702 and the channel 712 formed in the hub 704.

Figure 8A:
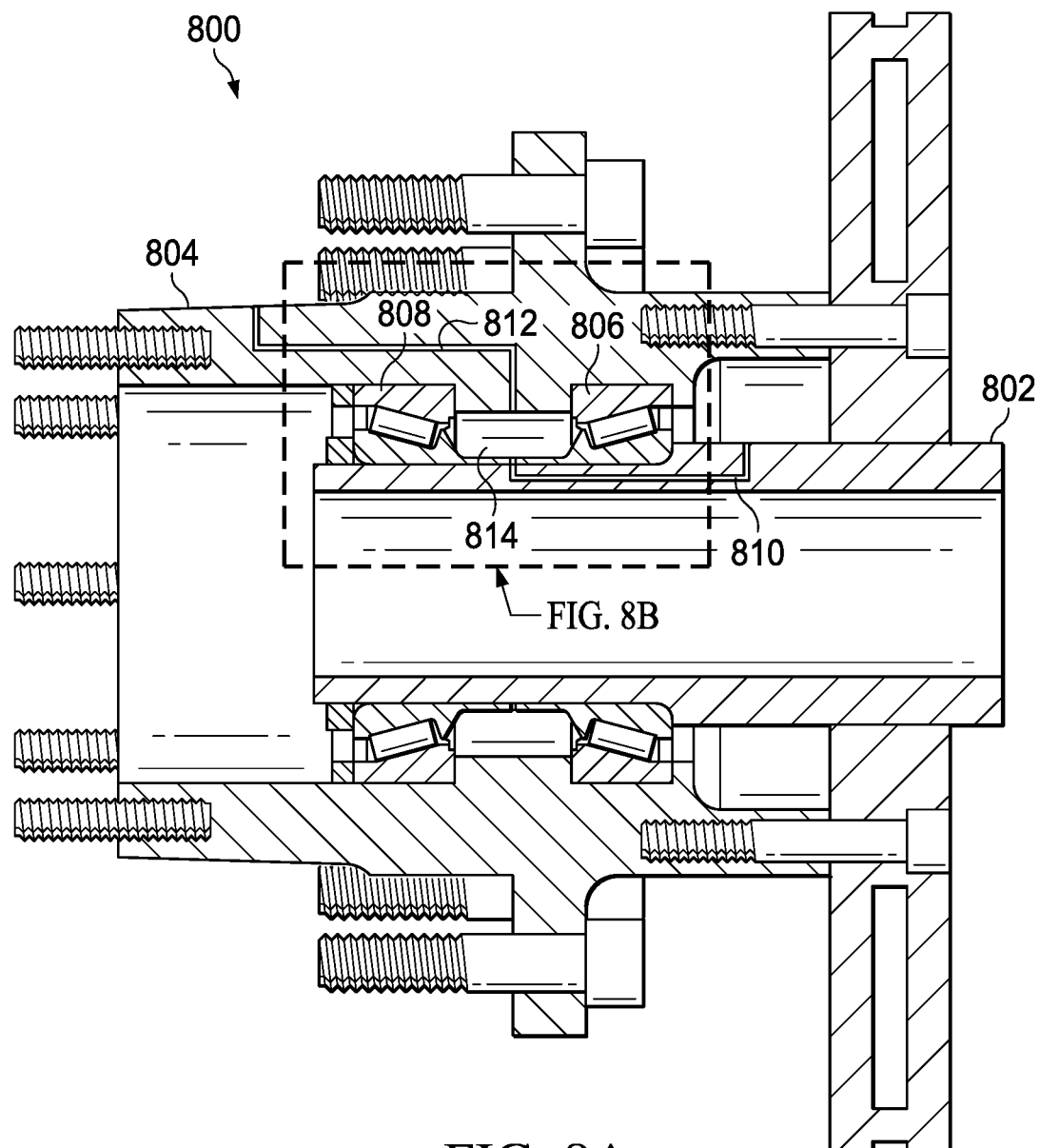
FIG. 8A is a partial cross-sectional view of an axle of an ATIS according to a described embodiment.
Figure 8B:
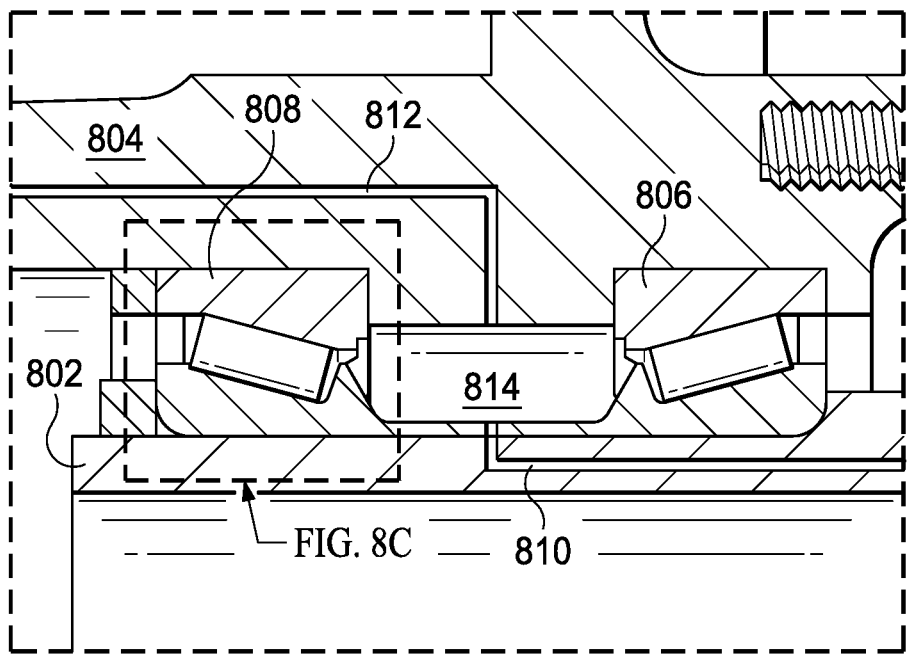
FIG. 8B is a partial cross-sectional view detailing a packed bearing set of FIG. 8A.
Figure 8C:
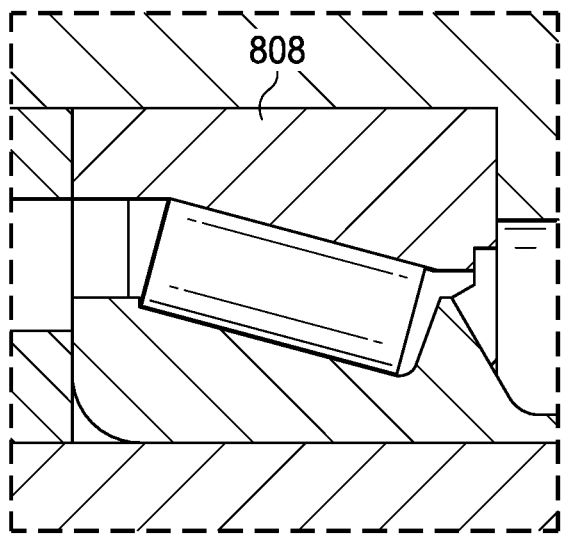
FIG. 8C is a partial cross-sectional view detailing a portion of the packed bearing set of FIGS. 8A and 8B.

FIG. 8A is a partial cross-sectional view of an axle of an ATIS according to a described embodiment. FIG. 8B is a partial cross-sectional view detailing a packed bearing set of FIG. 8A. FIG. 8C is a partial cross-sectional view detailing a portion of the packed bearing set of FIGS. 8A and 8B. Referring to all of FIGS. 8A, 8B, and 8C, the axle 800 includes elements similar to those of the axle of the ATIS 202 of the first embodiment of FIG. 2 except that a spindle 802 of the axle 800 is not tapered. The axle 800 includes the spindle 802 that couples to a hub 804 by an inner bearing 806 and an outer bearing 808. The inner bearing 806 and the outer bearing 808 form a volume 814 that couples a channel 810 formed in the spindle 802 to a channel 812 formed in the hub 804 to couple air flow there between. The volume 814 may protect a rotary air seal installed therein from the external environment. The rotary air seal of the embodiment 800 of FIG. 8A, when present, may further be operable in both a sealed state and an unsealed state. With the axle 800, however, the volume 814 between the inner bearing 806 and the outer bearing 808 may provide a sealed path between the channel 810 formed in the spindle 802 and the channel 812 formed in the hub 804.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. An Automatic Tire Inflation System (ATIS) for use with a vehicle, the ATIS comprising:
   a controller;
   valves controlled by the controller, the valves having an air supply inlet, and a plurality of air outlets;
   for at least one drive axle having inner bearings and outer bearings:
      a channel formed in a spindle;
      first hosing coupling a first valve of the valves controlled by the controller to the channel formed in the spindle;
      a channel formed in a hub;
      a rotary air seal residing between the inner bearings and the outer bearings and coupling the channel formed in the spindle to the channel formed in the hub; and
      second hosing coupling the channel formed in the hub to at least one wheel,
   wherein prior to air flowing to the at least one wheel, the controller causes transition of the rotary seal from an unsealed state to a sealed state to form a seal between the spindle and the hub to support air flow between the channel formed in the spindle and the channel formed in the hub, and wherein to transition the rotary seal the controller is configured to open a second valve of the valves which allows air to flow from the at least one wheel to the rotary air seal,
      wherein air pressure is applied to the rotary air seal via the air to cause the rotary air seal to transition from the unsealed state to the sealed state.

2. The ATIS of claim 1, further comprising a first fitting coupling the first hosing to the channel formed in the spindle.

3. The ATIS of claim 1, further comprising a second fitting coupling the second hosing to the channel formed in the hub.

4. The ATIS of claim 1, wherein the second hosing comprises connections for multiple wheels.

5. The ATIS of claim 1, wherein:
   the spindle is tapered;
   the inner bearings comprise inner tapered roller bearings; and
   the outer bearings comprise outer tapered roller bearings.

6. The ATIS of claim 1, wherein:
   the spindle is straight; and
   the inner bearings and outer bearings comprise a unitized bearing set.

7. The ATIS of claim 6, wherein the unitized bearing set includes:
   a first channel that couples the channel formed in the spindle to the rotary air seal;
   and a second channel that couples the channel formed in the hub to the rotary air seal.

8. The ATIS of claim 1, wherein the rotary air seal is configured to:
   reside in the sealed state; and
   reside in the unsealed state to negate the seal between the spindle and the hub.

9. The ATIS of claim 8, wherein transitioning the rotary air seal from the unsealed state to the sealed state is performed only when:
   a serviced vehicle is stationary; or
   a speed of the serviced vehicle is below a threshold speed.

10. The ATIS of claim 8, wherein the rotary air seal comprises a first side and a second side, each of the first side and the second side including:
    a first stationary portion sealed to an inner wall of the hub;
    a second stationary portion sealed to an inner wall of the spindle; and
    a movable portion coupled to the first stationary portion.

11. The ATIS of claim 8, wherein the rotary air seal comprises a first side and a second side, each of the first side and the second side including:
    a first stationary portion sealed to a first inner wall of a unitized bearing set;
    a second stationary portion sealed to a second inner wall of the unitized bearing set; and
    a movable portion coupled to the first stationary portion.

12. A method for operating an Automatic Tire Inflation System (ATIS) for use with a vehicle, the method comprising:
    monitoring air pressure of at least one tire;
    determining that inflation of the at least one tire is required; and
    opening a first valve to allow air to flow:
       from an air supply to a channel formed in a spindle via first hosing;
       from the channel formed in the spindle to a rotary air seal;
       from the rotary air seal to a channel formed in a hub; and
       from the channel formed in the hub to the at least one tire via second hosing,
    wherein prior to air flowing to the at least one tire, transitioning the rotary air seal from an unsealed state to a sealed state to establish a seal between a channel formed in the spindle to the channel formed in the hub, and wherein transitioning comprises:

opening a second valve of the valves which allows air to flow from the at least one tire to the rotary air seal, wherein air pressure is applied to the rotary air seal via the air to cause the rotary air seal to transition from the unsealed state to the sealed state.

13. The method of claim 12, further comprising:

after inflation is completed, transitioning the rotary air seal from the sealed state to the unsealed state to negate the seal between a channel formed in the spindle to the channel formed in the hub.

14. The method of claim 13, wherein transitioning the rotary air seal from the unsealed state to the sealed state is performed only when:

a serviced vehicle is stationary; or a speed of the serviced vehicle is below a threshold speed.

* * * * *